(12) United States Patent
Shor et al.

(10) Patent No.: US 9,921,592 B2
(45) Date of Patent: Mar. 20, 2018

(54) BANDGAP REFERENCE CIRCUIT WITH LOW OUTPUT IMPEDANCE STAGE AND POWER-ON DETECTOR

(71) Applicants: Joseph Shor, Yakum (IL); George L. Geannopoulos, Portland, OR (US); Fabrice Paillet, Hillsboro, OR (US); Lan D. Vu, Hillsboro, OR (US); Oleg Dadashev, Hadera (IL)

(72) Inventors: Joseph Shor, Yakum (IL); George L. Geannopoulos, Portland, OR (US); Fabrice Paillet, Hillsboro, OR (US); Lan D. Vu, Hillsboro, OR (US); Oleg Dadashev, Hadera (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,525

(22) PCT Filed: Sep. 9, 2013

(86) PCT No.: PCT/US2013/058751
§ 371 (c)(1),
(2) Date: Dec. 26, 2013

(87) PCT Pub. No.: WO2015/034534
PCT Pub. Date: Mar. 12, 2015

(65) Prior Publication Data
US 2016/0246315 A1  Aug. 25, 2016

(51) Int. Cl.
*G05F 3/30*  (2006.01)
*G05F 1/46*  (2006.01)
(Continued)

(52) U.S. Cl.
CPC .............. *G05F 1/468* (2013.01); *G05F 1/575* (2013.01); *G05F 1/59* (2013.01); *G05F 3/30* (2013.01); *G06F 1/26* (2013.01)

(58) Field of Classification Search
CPC ........................................................ G05F 3/30
See application file for complete search history.

(56) References Cited

U.S. PATENT DOCUMENTS

| 4,954,769 A | * | 9/1990 | Kalthoff .................. G05F 1/467 323/313 |
| 7,274,250 B2 | | 9/2007 | Hazucha et al. |

(Continued)

FOREIGN PATENT DOCUMENTS

| CN | 102063148 | 5/2011 |
| RU | 2344464 | 1/2009 |

(Continued)

OTHER PUBLICATIONS

Notification Concerning Transmittal of International Preliminary Report on Patentability of the International Searching Authority issued for International Patent Application No. PCT/US2013/058751, dated Mar. 24, 2016.

(Continued)

*Primary Examiner* — Albert Wang
(74) *Attorney, Agent, or Firm* — Womble Bond Dickinson (US) LLP

(57) ABSTRACT

Described is an apparatus which comprises: a bandgap core to provide a control signal; and an output stage coupled to the bandgap core, the output stage to receive the control signal and to provide a low impedance output at an output node.

19 Claims, 4 Drawing Sheets

(51) Int. Cl.
*G05F 1/575* (2006.01)
*G05F 1/59* (2006.01)
*G06F 1/26* (2006.01)

(56) References Cited

U.S. PATENT DOCUMENTS

| | | | | |
|---|---|---|---|---|
| 2005/0168270 | A1* | 8/2005 | Bartel | G05F 3/30 |
| | | | | 327/539 |
| 2007/0040601 | A1* | 2/2007 | Lee | G05F 1/465 |
| | | | | 327/540 |
| 2008/0007243 | A1* | 1/2008 | Matsumoto | G05F 3/30 |
| | | | | 323/313 |
| 2009/0160419 | A1* | 6/2009 | Jang | G05F 3/30 |
| | | | | 323/313 |
| 2013/0099764 | A1* | 4/2013 | Zhang | G05F 1/575 |
| | | | | 323/273 |

FOREIGN PATENT DOCUMENTS

| | | |
|---|---|---|
| RU | 117052 | 6/2012 |
| SU | 1765810 | 9/1992 |

OTHER PUBLICATIONS

Hazucha, Peter, et al., "Low Voltage Buffered Bandgap Reference", *ISQED '07 Proceedings of the 8th International Symposium on Quality Electronic Design*, pp. 93-97.

\* cited by examiner

US 9,921,592 B2

BANDGAP REFERENCE CIRCUIT WITH LOW OUTPUT IMPEDANCE STAGE AND POWER-ON DETECTOR

CLAIM OF PRIORITY

This application claims the benefit of priority of International Patent Application No. PCT/US2013/058751 filed Sep. 9, 2013, titled "BANDGAP REFERENCE CIRCUIT WITH Low OUTPUT IMPEDANCE STAGE AND POWER-ON DETECTOR," which is incorporated by reference in its entirety.

BACKGROUND

A bandgap reference generator is used to generate a constant bandgap reference voltage. This constant bandgap reference voltage may be temperature independent and can be used for different applications. For example, the constant bandgap reference voltage may be used in digital-to-analog converters (DACs), phase locked loops (PLLs), linear voltage regulators (VRs), DC-DC converters, RF circuits, etc.

Bandgap reference architecture is shown with reference to FIG. 1. Architecture 100 consists of a bandgap reference generator 101, a current source formed from p-type transistor MP1, and load 102 to receive the bandgap reference (bgref) voltage. Transistor p-type MP1, or a resistor, biased by Vbias can be used to provide supply current to load 102. One problem with architecture 100 is that because of process variations, current drawn by bandgap reference generator 101 and from node bgref (i.e., by load 102) can vary significantly. Thus the quiescent current of p-type transistor MP1 is designed with a lot of spare current providing capability.

This "spare" current capability becomes wasted current in most cases and can be two to three times waste compared to the minimum current needed by bandgap reference generator 101. Also, if there are current transients on node bgref, the response of bandgap reference generator 101 may be very slow, since bandgap reference generator 101 needs to go through the entire loop (not shown) of the bandgap reference generator 101, which may have limited bandwidth (typically, 20 MHz). Because of this low bandwidth, the power supply rejection ratio (PSRR) of architecture 100 at high frequencies is poor.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
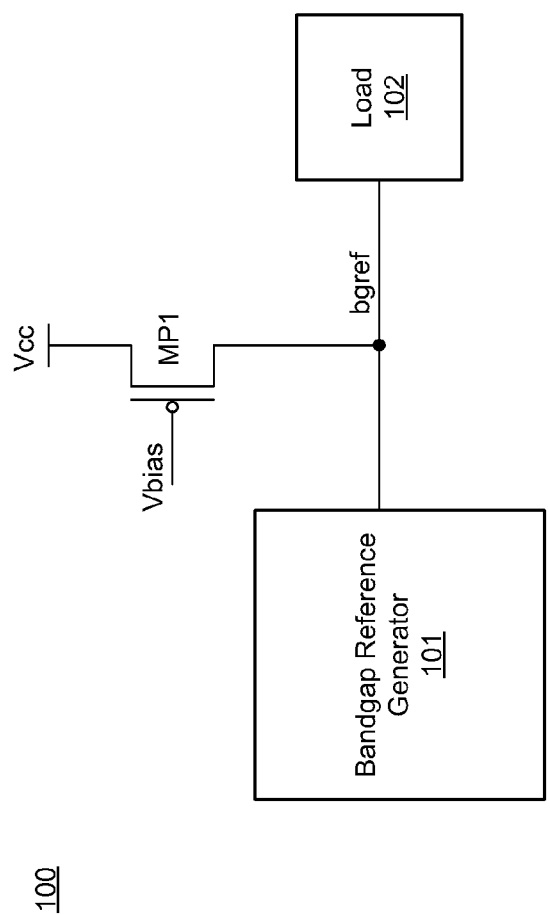
FIG. 1 illustrates a traditional bandgap reference generating architecture.

The embodiments describe a bandgap reference generator which exhibits a very low impedance output (compared to output impedance of traditional bandgap reference generators) so that the bandgap reference generator can drive large AC (alternating current), e.g. 1-10 mA. Most outputs of bandgap reference generators (e.g., output of bandgap reference generator 101) have high AC and/or DC impedances and are very sensitive to AC load current. In one embodiment, a bandgap reference core is driven by a source follower which enables the bandgap reference generator to drive a large variation of currents, and also to respond quickly to current transients on the bandgap reference output node (which carries the bandgap reference voltage). In the embodiments, an output node of the bandgap core provides a bandgap reference (bgref) which is very insensitive to the current load across frequency. In one embodiment, the low impedance output stage also enables the bandgap reference to exhibit a higher PSRR than standard bandgap reference voltages as generated by architecture 100.

In one embodiment, bandgap reference generator further comprises a circuit to provide an indicator to show that the bandgap reference has reached its target output reference value. In such an embodiment, the indicator can be used as a security feature to indicate that voltages on the chip (which includes the bandgap reference generator) have reached their desired level. In one embodiment, the indicator is used as a power-good indicator to enable all or some circuits dependent on the bandgap reference.

In one embodiment, the bandgap reference generator comprises a bandgap reference core coupled to a low impedance output stage which also enables high PSRR at all (or most) frequencies and exhibits lower sensitivity to output noise. In one embodiment, the bandgap reference generator further comprises power-on-detect circuit coupled to the low impedance output stage to indicate when bgref (i.e., output of the low impedance output stage) has achieved a target level.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within+/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 2:
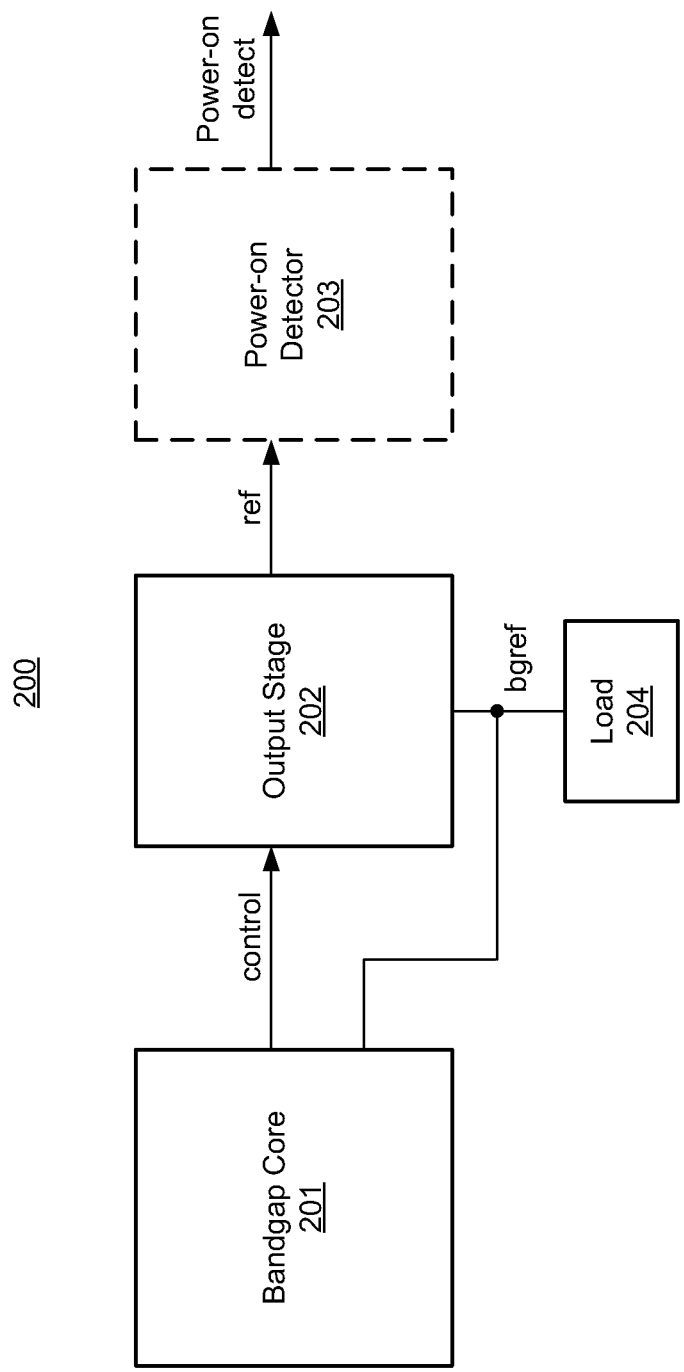
FIG. 2 illustrates an architecture to generate bandgap reference with low output impedance stage and with power-on detector, according to one embodiment of the disclosure.

FIG. 2 illustrates architecture 200 of a bandgap reference generator with low output impedance stage and power-on detector, according to one embodiment of the disclosure. It is pointed out that those elements of FIG. 2 having the same reference numbers (or names) as the elements of any other figure can operate or function in any manner similar to that described, but are not limited to such.

In one embodiment, architecture 200 comprises a bandgap core 201, a low impedance output stage 202, power-on detector 203, and load 204. In one embodiment, bandgap core 201 is similar to bandgap reference generator 101. One such circuit of bandgap core 201 is illustrated with reference to FIG. 3, according to one embodiment. However, in other embodiments other types of bandgap cores may be used for bandgap core 201.

Referring back to FIG. 2, in one embodiment, bandgap core 201 provides a control signal to the low output impedance stage 202. In one embodiment, the control signal in part causes output stage 202 to have low output impedance compared to output impedance of bandgap generator 100. In one embodiment, output of output stage 202 is the bandgap reference (bgref) which is provided to load 204. In one embodiment, bgref is used as power supply for load 204. In one embodiment, load 204 is one or more of a processor core, cache memory, graphics unit, or any other logic unit. In other embodiments, load 204 can be any circuit or functional unit that demands power supply. In one embodiment, bgref is coupled to a power supply node for providing power to various circuits of bandgap core 201.

In one embodiment, bgref is driven by a source follower of output stage 202. In one embodiment, output stage 202 includes a fast negative feedback loop which regulates the gate of the source follower. In one embodiment, the fast feedback loop is much faster (e.g., greater than 10×,) than the overall loop of the bandgap core 201. In one embodiment, output stage 202 is configured to give a very good power supply rejection (e.g., approximately 35-40 dB at all frequencies).

In one embodiment, power-on detector 203 is coupled to output stage 202. In one embodiment, power-on detector 203 minors current (via ref signal) of output stage 202 and compares it with a reference to determine whether bgref voltage has reached its target level. In one embodiment, output of power-on detector 203 is a power-on detect signal (POD) which can be used to reset or perform a specific task when the power-on detect signal asserts (i.e., transitions from one logical level to another logical level). In one embodiment, power-on-detector 203 measures the current of the driver in output stage 202 and compares that current to a reference. In one embodiment, when this current of the driver is stabilized, it indicates that bgref is stable and ready for use.

Figure 3:
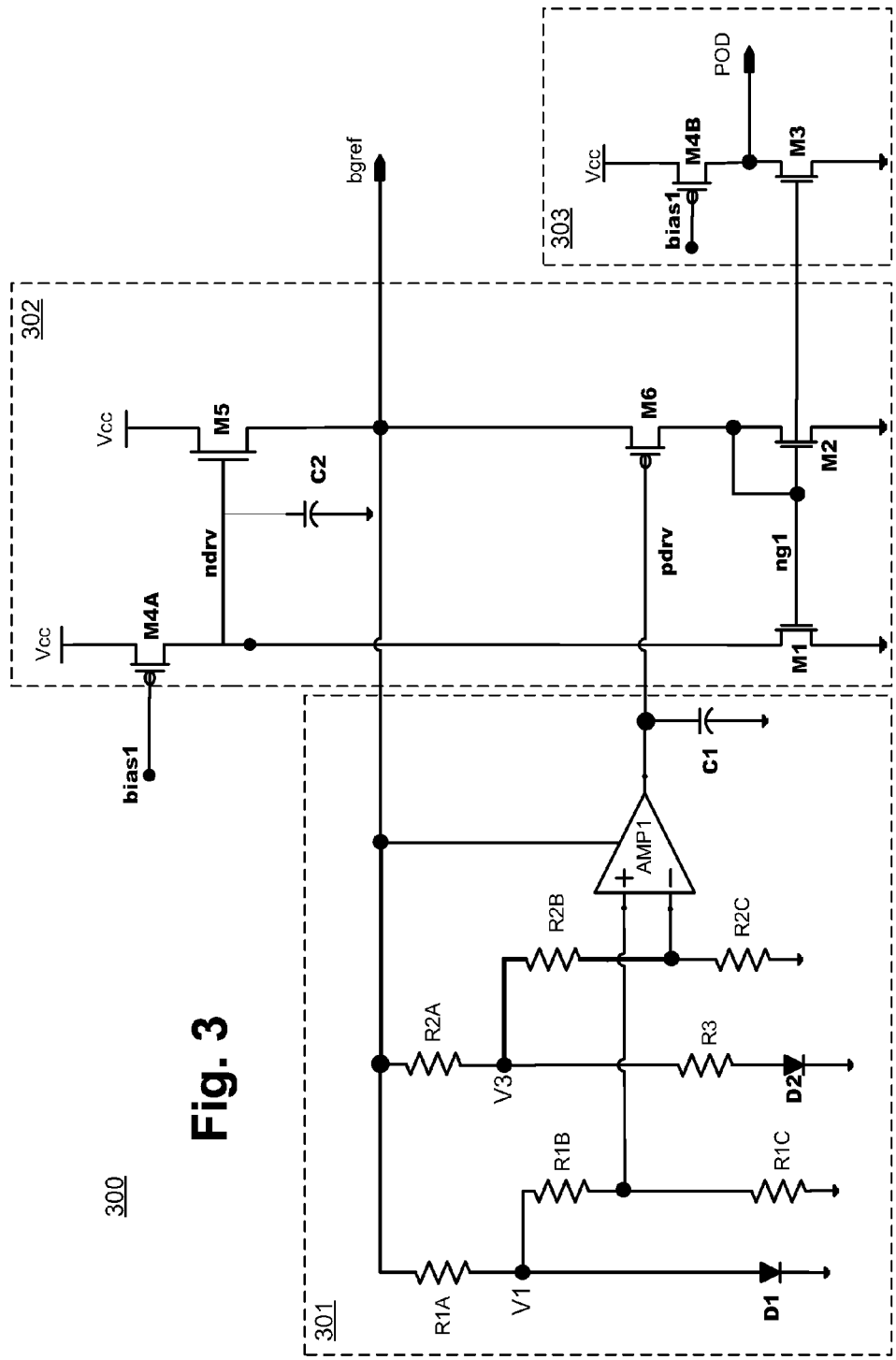
FIG. 3 is a circuit level schematic of the bandgap reference architecture of FIG. 2, according to one embodiment of the disclosure.

FIG. 3 is a circuit level schematic 300 of the bandgap reference generator 200 of FIG. 2, according to one embodiment of the disclosure. It is pointed out that those elements of FIG. 3 having the same reference numbers (or names) as the elements of any other figure can operate or function in any manner similar to that described, but are not limited to such.

In one embodiment, circuit level schematic 300 comprises bandgap core 301 (e.g., 201), output stage 302 (e.g., 202), and power-on detector 303 (e.g., 203). In one embodiment, bandgap core 301 comprises amplifier AMP1; resistors R1A, R1C, R2A, R2B, R2C, and R3; diodes D1 and D2, and. capacitor C1. In one embodiment, resistor R2B is optional and can be replaced with a wire (i,e., R2B is zero) In such an embodiment, bandgap core 301 operates at low voltage, In one embodiment, amplifier AMP1 is an operational amplifier which may be single stage or multiple stages amplifier. In one embodiment, diodes D1 and D2 have exponential dependency of current on voltage (exponential I(V) characteristic). In one embodiment, resistors R1A, R1B, and R1C operate to bias diode D1 at a first point of its range, while resistors R2A, R2B, R2C, and R3 bias diode D2 at a second point of its range.

In various embodiments, diodes D1 and D2 may be implemented as actual PN junction diodes, as the base-emitter junction of a bipolar transistor (BYE), or as another component with an exponential I(V) characteristic. The generic term "diode" here refers to these circuit elements. In some embodiments, a "string" of several diodes or base-emitter junctions may be formed in series, instead of a single diode or transistor, In one embodiment, resistors R1B and R1C: form a voltage divider to produce a voltage proportional to V1, which is the voltage across diode D1. In one embodiment, resistors R2B and R2C form a voltage divider to produce a voltage proportional to V3, which is the voltage across diode D2 and resistor R3. In one cuihodinzcnt, amplifier AMP1 300 is an active component that compares the voltages of the two voltage dividers and produces an output signal pdry (same as control signal of FIG. 2). In one embodiment, bgref of bandgap core 301 is a temperature insensitive reference. In this embodiment, the resistor/diode configuration of bandgap core 301 and the feedback provided by signal pdry and output stage 302 results in the temperature independence of bgref. In one embodiment, bandgap core 301 has the temperature insensitive bgref voltage at a common node at the top of the resistor/diode configuration and thus can be driven by a single driver M5. In one embodiment, bandgap core 301 is referred to as a resistor-based bandgap core.

In one embodiment, output stage 302 comprises n-type driver M5, p-type current source M4A, p-type source follower M6, current minor n-type transistors M1 and M2, and capacitor C2. In one embodiment, capacitor C2 improves PSRR by linking the gate terminal of n-type transistor M5 to Vss. In one embodiment, M4A is biased by bias1. In one embodiment, bias1 may be generated by any known bias generators, e.g., resistor divider. In one embodiment, n-type transistor M5 is the main driver. In one embodiment, gate voltage of M5 is regulated by the transistors M1, M2, M4A and M6, which form the fast negative feedback loop. In one embodiment, amplifier AMP1 drives the gate of M6 which is configured as a source follower.

In one embodiment, when bgref output is low, current in M6 is starved and the negative feedback path raises the voltage on gate terminal of M5 to compensate for the low bgref output. In such an embodiment, the DC (direct current) voltage level of gate terminal of M6 is constant with load (e.g., 204 on node bgref) demand, which gives circuit 300 a relatively high gain, since the DC conditions of the amplifier do not change with load. In one embodiment, when there is a current transient on load 204, then both the source follower action of M5 and the fast negative feedback loop will correct the transient effect. In one embodiment, PSRR is further improved over PSRR of architecture 100 by adding capacitor C2 to the gate terminal of M5. In one embodiment, capacitor C2 has a capacitance in the range of approximately 1-2 pF. In other embodiments, other range for capacitance may be used.

In this embodiment, low output impedance at node bgref is achieved by M5 and/or the negative feedback loop formed from transistors M6, M2, and M1. In one embodiment, bgref is provided as power supply to amplifier AMP1. In other embodiments, amplifier AMP1 has an independent power supply. In one embodiment, when circuit 300 is in steady state and then load 204 suddenly demands large current, bgref lowers in voltage causing Vgs (gate to source voltage of M5) to become large. A large Vgs causes M5 to provide more current to bgref node to compensate for the load demand.

In one embodiment, current through M1 is the same current through M4A which is mirrored by M2 (via diode connected terminal ng1). When load 203 (coupled to bgref node) suddenly demands more current, the negative feedback loop causes voltage on ndrv node to rise i.e., ndrv=bgref+Vt5, where Vt5 is threshold voltage of M5. The operation of the negative feedback loop is described as follows.

In one embodiment, during DC conditions, the current through M6 is the same or scaled to the current in M4A, since there is a current mirror M1/M2 which equalizes their value. In one embodiment, an AC current transient causes a slight droop in the bgref voltage which causes the Vgs voltage of M6 to be reduced. In one embodiment, reduction in Vgs lowers M6 current according to the MOS square law. In such an embodiment, this current reduction is mirrored by M1/M2 and the pull down current of M1 will be less than the pull-up current of M4A, thus raising ndrv and hence the bgref voltage until the circuit re-enters its steady-state condition where the M1 current is equal to the M4A current. In one embodiment, the negative feedback loop samples the current in M6 and transfers the AC changes in this current back to the gate of M5 and hence the output.

In various embodiments, output driver 302 achieves low output impedance by driving the output by source follower M5 whose Vgs changes instantaneously to an AC event, thus changing the output current. In various embodiments, output driver 302 also achieves low output impedance by the localized negative feedback mechanism, which also changes the output current quickly to an AC stimulus. In such an embodiment, the feedback does not need to go through the main feedback loop (including 301) which is much slower.

In one embodiment, power-on detector 303 comprises n-type transistor M3 and p-type transistor M4B. In one embodiment, M4B is biased by bias1. In one embodiment, M4B may be biased by a different bias signal than bias1. In one embodiment, power-on detector 303 samples the current at M2. In one embodiment, during power-up (i.e., when Vdd is ramping from zero to its high level), current through M2 is very low, since the slow loop is trying to drive pdrv higher, thus closing M6. In such an embodiment, current through M3 is also low because it is mirrored current of M2. In one embodiment, when steady state is reached, the current in M2 (and hence M3) is much higher than the bias current from M4B causing the output voltage (power-on detector signal) to trip. In one embodiment, the tip point of power-on detector 303 is adjusted by adjusting the size (i.e., W/L) of M3. By sampling the current in M2, the transistor M3 in power-on-detector 303 samples the current changes in M5 to detect when the bgref signal has reached its target value.

Figure 4:
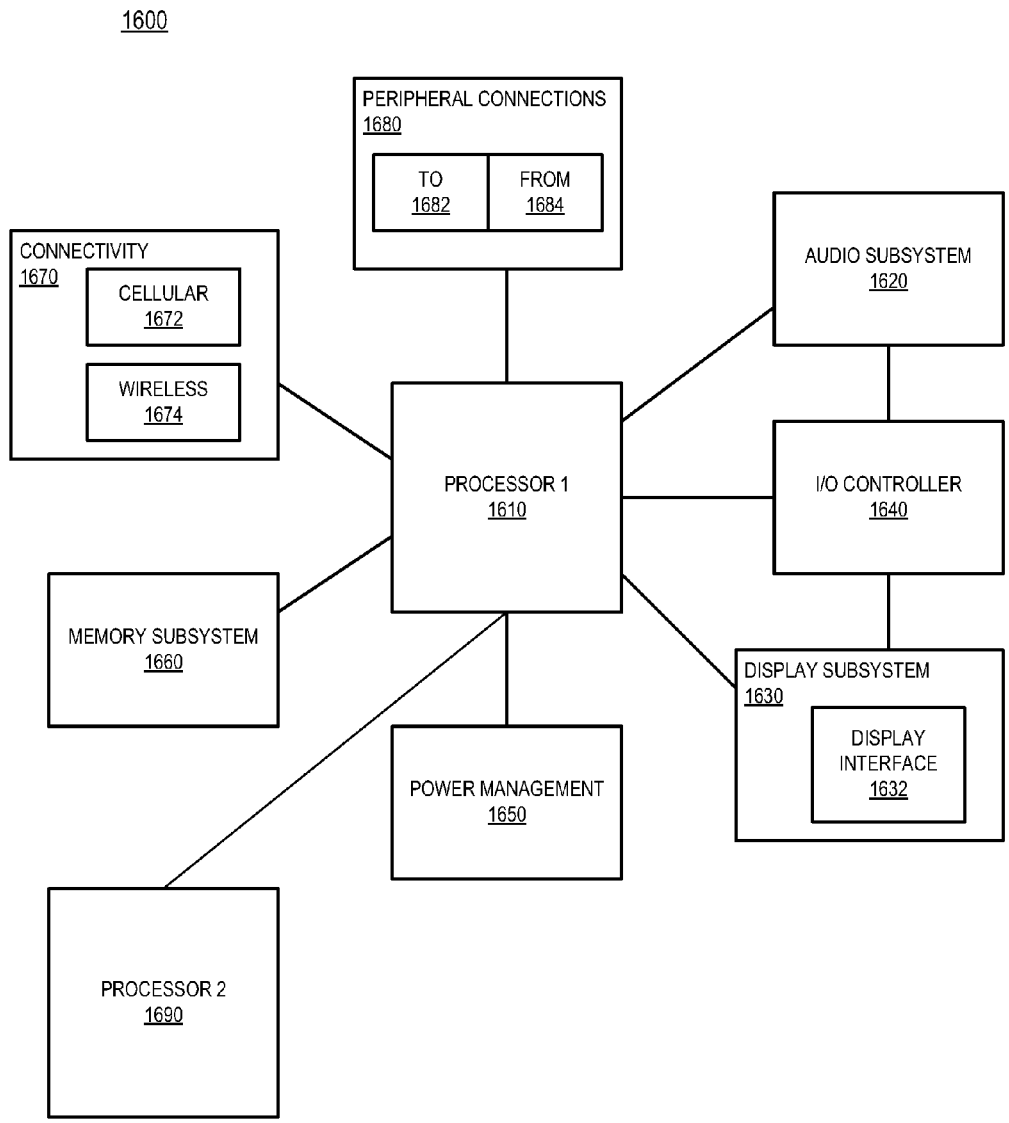
FIG. 4 is a smart device or a computer system or an SoC (system-on-chip) with the bandgap reference architecture, according to one embodiment of the disclosure.

FIG. 4 is a smart device or a computer system or an SoC (system-on-chip) 1600 with the bandgap reference architecture, according to one embodiment of the disclosure. It is pointed out that those elements of FIG. 4 having the same reference numbers (or names) as the elements of any other figure can operate or function in any manner similar to that described, but are not limited to such.

FIG. 4 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with the bandgap reference circuit architecture described with reference to embodiments discussed. Other blocks of the computing device 1600 may also include apparatus of with the bandgap reference circuit architecture described with reference to embodiments. The various embodiments of the present disclosure may also comprise a network interface within 1670 such as a wireless interface so that a system embodiment may be incorporated into a wireless device, for example, cell phone or personal digital assistant or a wearable device.

In one embodiment, processor 1610 (and/or processor 1690) can include one or more physical devices, such as microprocessors, application processors, microcontrollers, programmable logic devices, or other processing means. Processor 1690 may be optional. While the embodiment shows two processors, a single or more than two processors may be used. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus comprises: a bandgap core to provide a control signal; and an output stage coupled to the bandgap core, the output stage to receive the control signal and to provide a low impedance output at a first output node. In one embodiment, the bandgap core is a resistor-based bandgap. In one embodiment, the first output node is a temperature independent bandgap reference, which is coupled to the bandgap core.

In one embodiment, the apparatus further comprises: a power-on detector coupled to the output stage, the power-on detector having a second output node. In one embodiment, the power-on detector to compare a current of the output stage with a reference current to generate a power-on detect signal at the second output node of the power-on detector. In one embodiment, the power-on detector comprises: an n-type transistor to minor current of the output stage. In one embodiment, the power-on detector further comprises: a p-type transistor coupled in series with the n-type transistor, the p-type transistor to be biased by a bias signal, wherein a node common between the n-type transistor and the p-type transistor is coupled to the second output node of the power-on detector.

In one embodiment, the output stage comprises: an n-type output driver coupled to the first output node; and a negative feedback loop coupled to the n-type output driver. In one embodiment, the negative feedback loop includes a p-type source follower. In one embodiment, the negative feedback loop includes: a current source; and a current mirror coupled to the p-type source follower and the current source. In one embodiment, the output driver has a gate terminal coupled to the current source and the current mirror. In one embodiment, the bandgap core comprises an amplifier with an output coupled to the p-type source follower. In one embodiment, the first output node is coupled to a power supply node of the amplifier.

In one embodiment, the first output node is coupled to a power supply node to provide power supply to various devices of the bandgap core. In one embodiment, the output stage comprises: a p-type source follower to receive the control signal from the bandgap core; and an n-type driver coupled in series to the p-type source follower, wherein a common coupling node of the n-type driver and the p-type source follower forms the first output node. In one embodiment, the common coupling node is at source terminals of the p-type source follower and the n-type driver. In one embodiment, current in the p-type source follower is sampled and fed back by a negative feedback loop to a gate terminal of the n-type driver. In one embodiment, the apparatus further comprises a power on detector to sample the current in the p-type source follower and to compare the current to a reference current to produce a signal on a second output node.

In one embodiment, the first output node is a power supply node of at least one circuit element in the bandgap core. In one embodiment, the output stage comprises a capacitor coupled to a gate terminal of the n-type driver. In one embodiment, the output stage comprises: an n-type diode connected transistor coupled in series of the p-type source follower; and a first n-type transistor with a gate terminal coupled to a gate terminal of the n-type diode connected transistor.

In one embodiment, the output stage comprises: a p-type current source controllable by a bias signal, the p-type current source coupled in series with the first n-type transistor. In one embodiment, the apparatus further comprises: a power-on detector with a second output node and a second n-type transistor with a gate terminal coupled to a gate terminal of the first n-type transistor of the output stage, wherein a drain terminal of the second n-type transistor is coupled to the second output node. In one embodiment, the power-on-detector comprises a current source coupled to the second output node. In one embodiment, the first output node is coupled to a load.

In one embodiment, the bandgap core comprises: an amplifier with an first input, second input, and an output to provide the control signal; and a capacitor coupled to the output. In one embodiment, the first input is coupled to a first voltage divider having a first diode. In one embodiment, the second input is coupled to a second voltage divider having a second diode. In one embodiment, the first output node is coupled to a terminal of the first and second voltage dividers.

In another example, a system comprises: a memory unit; a processor, coupled to the memory unit, the processor including a voltage regulator according to embodiments of the apparatus discussed above; and a wireless interface for allowing the processor to communicate with another device. In one embodiment, the system further comprises a display unit which is a touch screen.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a bandgap core to provide a control signal; and
   an output stage coupled to the bandgap core, the output stage to receive the control signal and to provide a low impedance output at a first output node, wherein the first output node is coupled to the bandgap core and the output stage comprises an n-type driver coupled to the first output node, and a negative feedback loop coupled to the n-type output driver.

2. The apparatus of claim 1, wherein the bandgap core is a resistor-based bandgap.

3. The apparatus of claim 2, wherein the first output node is a temperature independent bandgap reference.

4. The apparatus of claim 1 further comprises:
   a power-on detector coupled to the output stage, the power-on detector having a second output node.

5. The apparatus of claim 4, wherein the power-on detector to compare a current of the output stage with a reference current to generate a power-on detect signal at the second output node of the power-on detector.

6. The apparatus of claim 4, wherein the power-on detector comprises:
   an n-type transistor to mirror current of the output stage; and
   a p-type transistor coupled in series with the n-type transistor, the p-type transistor to be biased by a bias signal, and wherein a node common between the n-type transistor and the p-type transistor is coupled to the second output node of the power-on detector.

7. The apparatus of claim 1, wherein the negative feedback loop includes a p-type source follower.

8. The apparatus of claim 7, wherein the negative feedback loop includes:
   a current source; and
   a current mirror coupled to the p-type source follower and the current source.

9. The apparatus of claim 8, wherein the output driver has a gate terminal coupled to the current source and the current mirror.

10. The apparatus of claim 1, wherein the first output node is coupled to a power supply node to provide power supply to various devices of the bandgap core.

11. The apparatus of claim 1, wherein the output stage comprises:
    a p-type source follower to receive the control signal from the bandgap core; and
    an n-type driver coupled in series to the p-type source follower, and wherein a common coupling node of the n-type driver and the p-type source follower forms the first output node.

12. The apparatus of claim 11, wherein the common coupling node is at source terminals of the p-type source follower and the n-type driver, and wherein current in the p-type source follower is sampled and fed back by a negative feedback loop to a gate terminal of the n-type driver.

13. The apparatus of claim 12 further comprises a power on detector to sample the current in the p-type source follower and to compare the current to a reference current to produce a signal on a second output node.

14. The apparatus of claim 11, wherein the first output node is a power supply node of at least one circuit element in the bandgap core.

15. The apparatus of claim 11, wherein the output stage comprises a capacitor coupled to a gate terminal of the n-type driver.

16. The apparatus of claim 11, wherein the output stage comprises:
    an n-type diode connected transistor coupled in series of the p-type source follower;
    a first n-type transistor with a gate terminal coupled to a gate terminal of the n-type diode connected transistor; and
    a p-type current source controllable by a bias signal, the p-type current source coupled in series with the first n-type transistor.

17. The apparatus of claim 16 further comprises:
    a power-on detector with a second output node and a second n-type transistor with a gate terminal coupled to a gate terminal of the first n-type transistor of the output stage, wherein a drain terminal of the second n-type transistor is coupled to the second output node, wherein the power-on-detector comprises a current source coupled to the second output node.

18. A system comprising:
    a memory unit;
    a processor, coupled to the memory unit, the processor including
        a bandgap core to provide a control signal; and
        an output stage coupled to the bandgap core, the output stage to receive the control signal and to provide a low impedance output at a first output node, wherein the first output node is coupled to the bandgap core and the output stage comprises an n-type output driver coupled to the first output node, and a negative feedback loop coupled to the n-type output driver; and
    a wireless interface for allowing the processor to communicate with another device; and
    a display unit.

19. A system comprising:
    a voltage regulator which includes:
        a bandgap core to provide a control signal; and
        an output stage coupled to the bandgap core, the output stage to receive the control signal and to provide a low impedance output at a first output node, wherein the first output node is coupled to the bandgap core and the output stage comprises a n-type output driver coupled to the first output node, and a negative feedback loop coupled to the n-type output driver;
    a processor coupled to the voltage regulator; and
    a wireless interface for allowing the processor to communicate with another device.

* * * * *